Jan. 26, 1954 A. J. HUCK ET AL 2,667,566
LOWER BOWL CONSTRUCTION FOR VACUUM TYPE
COFFEE MAKERS AND SWITCH THEREFOR
Filed March 9, 1953 2 Sheets-Sheet 1
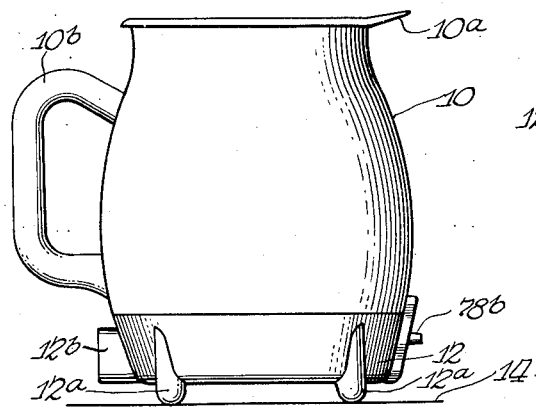
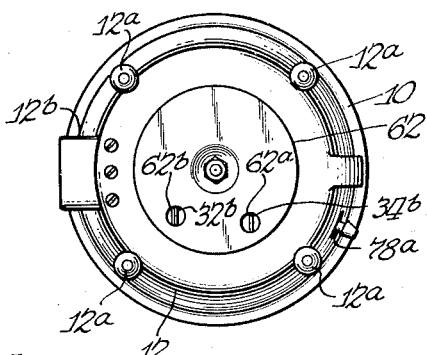
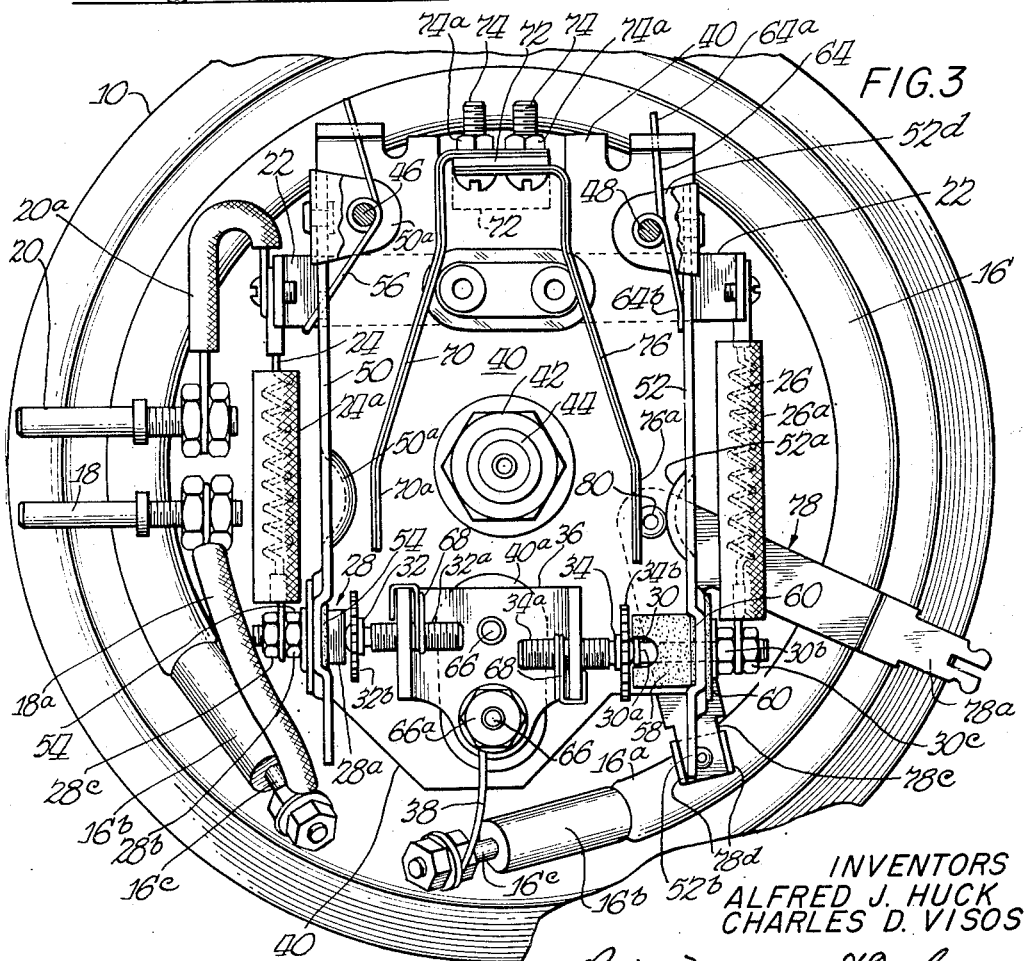
INVENTORS
ALFRED J. HUCK
CHARLES D. VISOS
BY Bair, Freeman & Molinare
ATTORNEYS

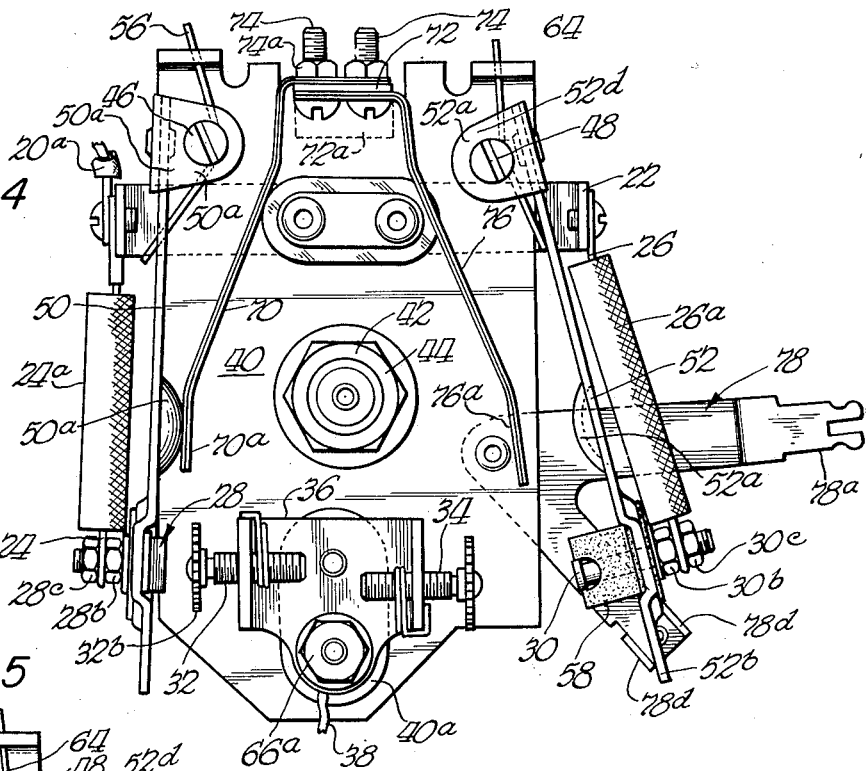
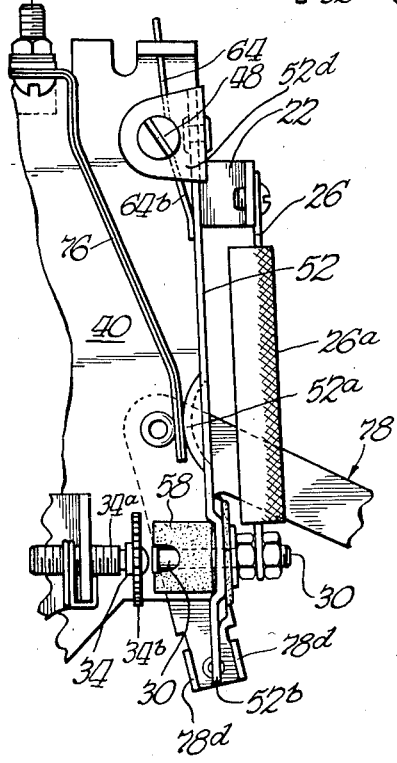

Patented Jan. 26, 1954

2,667,566

UNITED STATES PATENT OFFICE 2,667,566

LOWER BOWL CONSTRUCTION FOR VACUUM TYPE COFFEE MAKERS AND SWITCH THEREFOR

Alfred J. Huck and Charles D. Visos, St. Louis, Mo., assignors to Knapp-Monarch Company, St. Louis, Mo., a corporation of Delaware Application March 9, 1953, Serial No. 341,248

4 Claims. (Cl. 219—43)

Our invention relates to an improved lower bowl for a vacuum type coffee maker and a switch mechanism therefor, operable to deenergize the unit positively when the water has been discharged to the upper bowl while at the same time embodying a simple, reliable structure that is readily manufactured without undue production expense.

In the structure of the present invention the lower bowl of a vacuum type coffee maker has a heat conducting support post depending therefrom. This post carries a pair of spaced bimetals, each of which cooperates with a movable contact arm. One bimetal is the "keep warm" bimetal and pushes its contact arm to open circuit position at a temperature below water-boiling temperature. It thus acts at all times to tend to maintain the desired "keep warm" temperature—remaining off during the period that the water is actually boiling in the lower bowl. The other bimetal is the "brew control" bimetal and it engages its contact arm to drive it to open circuit condition only after the water is completely—or nearly completely—driven from the lower bowl. The brew control contact arm carries a magnet which coacts with a keeper on the cooperating fixed contact to hold the contact-making condition against the bias of the biasing spring which tends to open the contact arm.

In the construction of the present invention the thermal capacity of the support post and the brew control bimetal is so chosen in relation to the heat conducting properties of these parts that flexure of the bimetal continues after the heater is deenergized. In this fashion the magnet is driven to increased spacing with respect to the heater after heating action has ceased. This imparts a positive shut off action to the unit which prevents the cycling action which would otherwise result from the fact that the magnet action continues—at decreasing power—after the contacts are driven to spaced positions.

The apparatus of the present invention also includes a hand operated lever arm—accessible from outside the unit—which permits manual movement of the brew control arm to open or to closed position as desired.

It is, therefore, a general object of the present invention to provide an improved lower bowl unit for a vacuum type coffee maker and a switch unit for the same.

A more particular object of the present invention is to achieve the above object in a simple, inexpensive, and reliable structure that is readily manufactured and will withstand abuse.

The novel features which we believe to be characteristic of our invention are set forth with particularity in the appended claims. Our invention itself, however, both as to its organization and mode of operation—together with further objects and advantages thereof—will best be understood by reference to the following description taken in connection with the accompanying drawings, in which:

Figure 1 is a side elevational view of a lower bowl for a vacuum type coffee maker constructed in accordance with the present invention;

Figure 2 is a view of the bowl of Figure 1 from the bottom;

Figure 3 is a greatly enlarged view of the bowl of Figure 1 from the bottom with the bottom skirt member removed;

Figure 4 is a fragmentary view like Figure 3 but showing the unit at the close of the coffee-brewing cycle;

Figure 5 is a fragmentary view like Figure 3 but showing the unit at the moment the brew control arm snaps free of the brew control bimetal; and Figure 6 is a chart showing the temperatures in the unit during a brewing operation.

The lower bowl shown in Figure 1 consists of a metal bowl part 10 having a pouring lip 10a and a handle 10b. This bowl is supported from a table 14, or the like, by the enclosing bottom skirt 12 which is of insulating material, preferably a thermosetting plastic. As shown, this skirt has four feet 12a and a plug-receiving socket part 12b.

In coffee brewing operations an upper bowl (not shown) containing coffee grounds is placed over bowl 10. Bowl 10, filled with water, is heated to boil out the water through a depending tube from the upper bowl provided for this purpose. When the water is nearly completely driven from the lower bowl to the upper bowl, the heat is cut off, causing vacuum action as the lower bowl cools to drive the resulting brew back into the lower bowl. The apparatus of the present invention assures that this cycle is positively carried out automatically and, in addition, that the returned brew in the lower bowl 10 is held at a desirable warm coffee serving temperature.

The heater for the lower bowl 10 is indicated at 16, Figure 3. It is a U-shaped tube 16a of copper, or the like, soldered to the bottom of the bowl to assure good heat contact therewith. The tube 16a has an insulating liner 16b in which the Nichrome heating element 16c is embedded. One end of the element 16c is connected to male prong 18 by the insulated wire 18a. The other male prong, 20, is connected by the insulated wire 20a to the conducting bracket 22, through "keep warm" flexible wire 24 and contacts 28—32 or through brew control flexible wire 26 and contacts 30—34, to the bracket 36 and from bracket 36 to the other end of the heater 16 by the wire 38, thus defining a complete heating circuit extending from the prongs 18 and 20 through the heater 16.

The panel 40 is supported from the bottom of the lower bowl in spaced relation therewith. It is held in place by the nut 42, which is threadedly received on the stud 44 depending from the bottom of the bowl. The panel 40 has a pair of depending posts 46 and 48 which swingably carry the contact arms 50 and 52, respectively, these being supported by the trunnion-defining ear parts 50a and 52a, respectively.

The contact arm 50 carries the contact 28 to achieve "keep warm" action. The contact 28 is defined by a bolt 28a which receives nut 28b to hold it on the contact arm 50. Insulating washers 54 prevent electrical contact between the contact arm 50 and the contact 28. The nut 28c anchors the end of flexible wire 24 to the contact 28. Sleeve 24a avoids accidental contact between wire 24 and the other parts of the unit. The contact arm 50 is biased in the circuit closing direction by the spring 56 which passes through openings in the arm and in the plate 40 for this purpose.

The contact arm 52 insulatingly carries the brew control contact 30. This contact extends from the headed part 30a through an opening in the magnet 58, an opening in the arm 52, to the nut 30b which clamps it to the arm. A second nut, 30c, clamps the end of the conductor 26 to define a circuit from conducting bracket 22 to the contact 30. The contact 30 is insulated from the contact arm 52 by the insulating washers 60.

The fixed contact 34 has a threaded shank 34a which is threadedly received in the conductor bracket 36. It also has a toothed adjusting disk 34b which can be adjusted through the opening 62a of the cover plate 62, Figure 2, to control the brewing temperature. The contact 34 and the disk 34b are of magnetic material to form a keeper or armature for the magnet 58, thus causing the magnet to act as a biasing element tending to urge the arm 52 to contact-making position as shown in Figure 3.

The spring 64 urges the arm 52 to contact-breaking position. As shown in Figure 3, end 64a of this spring is received in an opening in the bracket 40 and the end 64b seats against the face of arm 52 to urge it to contact-breaking position. The tension of this spring is so chosen that it is incapable of overpowering the effect of the magnet 58 until the magnet is spaced from the contact 34 by approximately the spacing shown in Figure 5.

The conducting bracket 36 is insulatingly supported from the panel 40 by the bolts 66 which are threadedly received in the bracket 36. The bracket 36 and the panel 40 are insulated from each other by suitable insulating washers (not shown) sandwiched between these parts and between the bolts 66 and the panel 40. Panel 40 is dimpled at 40a to hold the bracket 36 in spaced relation to the surface of the major part of the panel. A nut 66a is received on one bolt 66 to anchor one end of the wire 38 in conducting relation thereto.

The fixed contact 32 is generally like contact 34, having a threaded shank 32a received in the bracket 36 and a toothed adjusting disk 32b which is accessible through the opening 62b of the cover plate 62. Springs 68 are wrapped about the shanks of fixed contacts 32 and 34 to prevent their rotations under vibration or shock.

The "keep warm" contact arm 50 is driven to open circuit position by the "keep warm" bimetal 70. This bimetal is anchored to the support post 72 by the bolts 74 and nuts 74a. This bimetal extends at part 70a to proximity with the bearing-dimple 50a of the contact arm 50. The bimetal strips are oriented so that as it heats the bimetal part 70a bears against the dimple 50a to push the contact arm 50 to contact-breaking position as shown in Figure 4.

The "brew control" bimetal 76 is also secured to the post 72 by the bolts 74 and nuts 74a. This bimetal at part 76a extends to proximity with the bearing dimple 52a of the contact arm 52. As this bimetal is heated it swings in the counterclockwise direction of Figure 3 to engage arm 52 and drive it to the contact-breaking position of Figure 4.

The post 72 has a bent over pad part 72a, Figure 3, which seats against and is silver soldered to the bottom of the bowl 10 adjacent the heater 16. This post is relatively massive and is of copper or similar material. In one successful construction the post was made of $\frac{1}{2}'' \times \frac{1}{16}''$ copper strap, extending $\frac{3}{4}''$ below the bottom of the bowl and secured thereto by a pad about $\frac{1}{2}'' \times \frac{3}{8}''$. The bimetals were each about $\frac{1}{2}'' \times \frac{1}{32}''$ in width and thickness and a total of about $2\frac{3}{4}''$ long.

The contact arm 52 can be manually swung to contact-making or contact-breaking position, as desired. This is accomplished by rocker arm 78 which is pivotally carried from the panel 40 by the pin 80. At end 78a the rocker 78 extends outboard of the housing 12 through a suitable slot therein. A convenient handle 78b may be removably secured to this part of the rocker arm. The rocker arm extends at inboard part 78c to points straddling the contact arm 52 and has a pair of downturned ears 78d, one extending on each side of the end 52b of the arm 52. This forms a lost motion connection which permits control of the position of the arm 52 by the rocker arm 78.

*Operation*

When the lower bowl 10 is filled with water, the upper bowl (not shown) is in position, and coffee is to be brewed, the prongs 18 and 20 are connected to a suitable source of electrical energy. At this time the parts have the positions shown in Figure 3, thus energizing heater 16 through both the "keep warm" contacts 28—32 and the "brew contacts" 30—34.

The bottom of the bowl 10 then heats as shown by curve A, Figure 6, until time $t_1$ is reached. At this time the temperature, $T_2$, is at water-boiling temperature and water is boiled out of the lower bowl, through the depending tube of the upper bowl into the upper bowl. Concurrently with this action the two bimetals 70 and 76 heat along the curve B, this heating being to a temperature determined by their heat losses to the surrounding parts, their thermal conductivity, the thermal conductivity of the post 72, and the heat conductivity of the post 72.

Prior to the time $t_1$, the "keep warm" bimetal 70 engages the contact arm 50 and throws it to open circuit position as shown in Figure 4.

When the water has nearly boiled out of the lower bowl 10, the bottom thereof becomes water-free and the temperature curve A suddenly rises. This is shown at $t_2$, Figure 6. The bimetals 70 and 76 partake of this temperature increase at a somewhat slower rate by reason of their own thermal capacity and that of the post 72 and the bolts and nuts 74. However, at the time $t_3$ the bimetal 76 reaches its contact-breaking temperature $T_1$ and overcomes the attraction of the magnet 58 to deenergize the heater 16 since the contacts 28—32 have previously opened and this action opens contacts 30—34.

This action does not, however, arrest the effective temperature rise of the bimetals. The bottom of the bowl 10 is still at a higher temperature than these parts because of the heat resistance of the bracket 72, the bimetals 70 and 76, and their thermal inertia. As a consequence the temperature curve B of the bimetals continues to climb after $t_3$, when the heater 16 is deenergized.

The continued heating of the bimetals causes them to reach a peak temperature at $t_4$ and then to cool with the other parts of the unit. Prior to reaching this temperature, however, the bimetal 76 drives the arm 52 to the position of Figure 5 where the bias of spring 64 overcomes the attraction of the magnet 58. At this time the spring takes control and drives the arm 52 to the position of Figure 4 where it remains until reset by swinging arm 78 from the position of Figure 4 to that of Figure 3.

After the above action, the unit cools and the brew is returned by vacuum action to the lower bowl 10. It is thereafter retained at a suitable drinking temperature by the bimetal 70 which engages the arm 50 and opens and closes contacts 28—32 to energize the heater 16 intermittently and maintain the desired temperature.

It will be noted that the arm 52 is only driven to the positively opened position of Figure 4 by the continued heating of bimetal 76 after the element 16 is deenergized. This continued heating is achieved by so choosing the thermal conductivity of the parts 70, 72, 74 74a and 76, their thermal capacity, and their dissipation of heat to other parts, that the bottom of the bowl 10 continues to heat the bimetals after the deenergization of element 16. This continued heating effect is made more pronounced by increasing the thermal resistance of these parts and increasing their surface area so that the bimetal temperature is substantially below the temperature of the bottom of the bowl. The continued heating effect is improved by limited increase of size of these parts as this causes the heater to remain energized until the actual bowl temperature is well above the contact-opening temperature of bimetal 76. Undue increase in the size of the parts, however, causes the response to be so sluggish that no effective temperature increase occurs at bimetal 76 after contacts 30—34 open.

While we have shown a specific embodiment of the present invention, it will, of course, be understood that modifications and alternative constructions can be made without departing from the true spirit and scope thereof. We, therefore, intend by the appended claims to cover all modifications and alternative constructions falling within their true spirit and scope.

What we claim as new and desire to secure by Letters Patent of the United States is:

1. In a coffee maker of the vacuum type having a lower bowl and an upper bowl, the improvement comprising: a heater for the lower bowl; energizing means including a pair of relatively movable switch contacts operable when closed to energize the heater; a permanent magnet on one contact; a magnet keeper on the other contact; spring means biasing the contacts to spaced relation but incapable of overcoming the magnet attraction; a bimetal arm; a support post affixed to the bottom of the lower bowl and supporting the bimetal in position to urge the contacts to spaced relation with increased temperature and to open the contacts when the temperature of the lower bowl exceeds water-boiling temperature, the effective thermal capacity of the support post and bimetal being so related to their heat conducting ability and heat losses as to cause the bimetal to continue flexing after the contacts separate.

2. In a coffee maker of the vacuum type having a lower bowl and an upper bowl, the improvement comprising: a heater for the lower bowl; energizing means including a pair of relatively movable switch contacts operable when closed to energize the heater, one contact being supported in fixed relation to the lower bowl and the other contact being supported by a movable contact arm; a permanent magnet on said other contact; a magnet keeper on said one contact; spring means biasing the contact arm in contact breaking direction but being incapable of overcoming the magnet attraction; a bimetal arm; a support post affixed to the bottom of the lower bowl and supporting the bimetal in position to urge the contacts to spaced relation with increased temperature and to open the contacts when the temperature of the lower bowl exceeds water-boiling temperature, the effective thermal capacity of the support post and the bimetal being so related to their heat conducting ability and heat losses as to cause the bimetal to continue flexing after the contacts separate.

3. A control mechanism for the lower bowl of a vacuum type coffee maker, the mechanism comprising: a support post affixed to the bottom of the bowl; a pair of spaced bimetal arms extending outwardly from the post; swingable contact bearing arms cooperatively associated with the bimetal arms respectively and adapted to be engaged thereby as the temperature rises; a unitary contact structure cooperatively associated with the contact-bearing arms respectively and positioned to assume an open circuit relation under the bias of the bimetal arms as temperature rises; a heater; means defining an energizing circuit through the contact structure and the contact-bearing arms in parallel to the heater; spring means biasing one contact-bearing arm in the closed circuit direction and of strength to be overcome by the bimetal below water-boiling temperature; magnet means urging the other contact-bearing arm in the closed circuit direction; and spring means urging the other contact-bearing arm in the open direction and incapable of overcoming the magnet pull, the effective thermal capacity, thermal conduction and heat losses of the support post and the bimetal cooperating with said other contact-bearing arm being such as to cause the bimetal to continue flexing after the contacts separate.

4. A control mechanism for the lower bowl of a vacuum type coffee maker, the mechanism comprising: a support post affixed to the bottom of the bowl; a pair of spaced bimetal arms extending outwardly from the arm; swingable contact bearing arms cooperatively associated with the bimetal arms respectively and adapted to be engaged thereby as the temperature rises; a unitary contact structure cooperatively associated with the contact-bearing arms respectively and positioned to assume an open circuit relation under the bias of the bimetal arms as temperature rises; a heater; means defining an energizing circuit to the heater through the contact structure and the contact-bearing arms in parallel; spring means biasing one contact-bearing arm in the closed circuit direction and strength to be overcome by the bimetal below water-boiling temperature; magnet means urging the other contact-bearing arm in the closed circuit direction; and lever means operable from outside the lower bowl adapted to swing said other contact arm selectively to contact-making or contact-breaking position, the thermal capacity and heat losses of said other contact arm being such that it continues to flex after the heater is deenergized.

ALFRED J. HUCK.
CHARLES D. VISOS.

No references cited.